July 7, 1931.  W. MATZKA  1,813,064
PRESERVING EGGS
Filed June 10, 1927
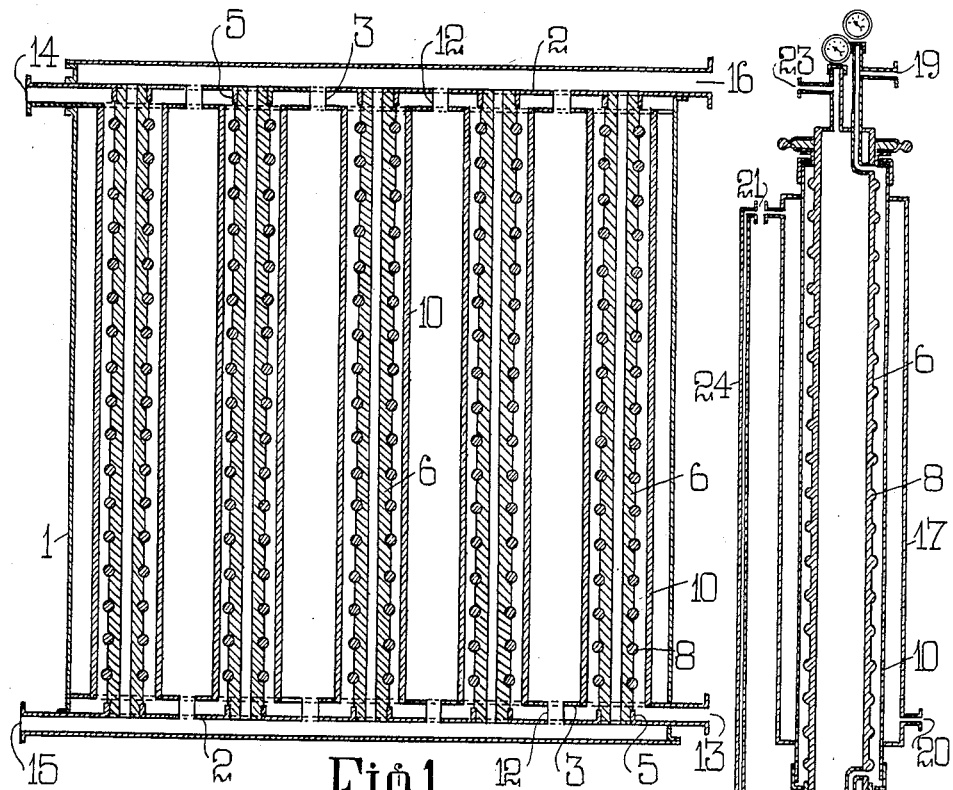
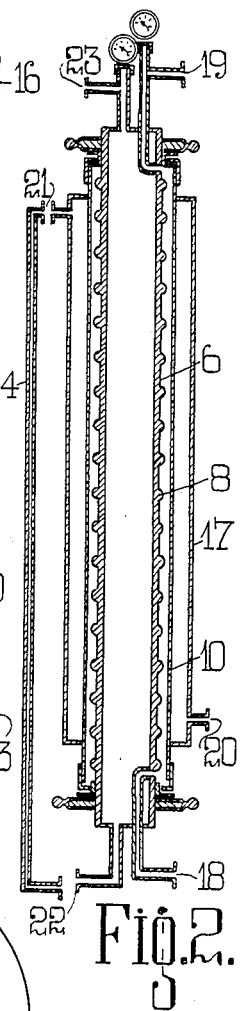
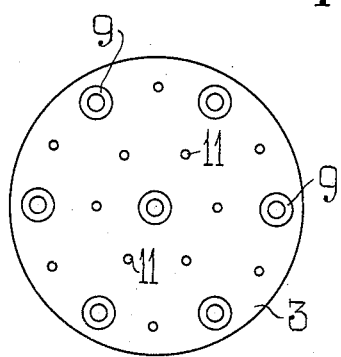
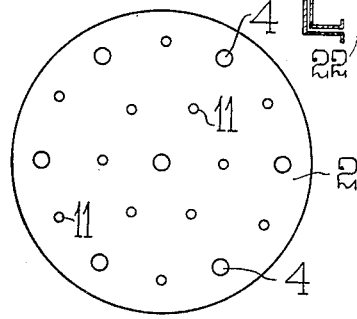
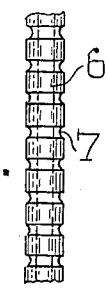
Fig.1. Fig.2. Fig.3. Fig.4. Fig.5. Fig.6.
Witnesses:
Inventor:
Wincenty Matzka
by Knight Bros
Attorneys Patented July 7, 1931

1,813,064

UNITED STATES PATENT OFFICE

WINCENTY MATZKA, OF LONDON, ENGLAND

PRESERVING EGGS

Application filed June 10, 1927, Serial No. 197,863, and in Great Britain August 6, 1926.

This invention relates to improvements in the preservation of eggs.

Large quantities are exported from China to Europe and America. During transport the egg cannot be preserved without deterioration either in the shell or broken into casks. Accordingly it is usual to break the eggs in China, separate the yolk from the white, dry the white in the sun, mix the yolk with 1½% boric acid and ship it in wooden casks. On arrival in Europe and America, water is added to these products, but it is difficult to regenerate the yolk and the white, partly because of bacterial infection and partly because of coagulation of the white. Preservation by boric acid is not satisfactory and, moreover, its use is forbidden by the laws of certain countries.

One of the objects of the present invention is to treat egg (by which is meant egg yolk, egg white or a mixture of the two known as whole egg, concentrated by evaporation or not) so as to render it substantially sterile without the addition of preservatives. Another object is to sterilize egg without causing any coagulation of albumen. Another object is to sterilize egg by heating to a temperature which is below that normally employed in pasteurization processes.

It has been found that if egg is brought to a temperature which is below that required to produce the pasteurization effect, e. g. 30–55° C, the micro-organisms are put in what may be termed a critical condition and can be destroyed by bringing them into contact with a body of noble metal such as gold and a body of aluminium. It is believed that the effect is to be ascribed partly to the electric currents which are produced in the metals owing to the temperature variations in their mass. It has been found that the effect is favourably influenced by independently heating the electrodes to different temperatures.

By this invention egg yolk, egg white or whole egg is sterilized by bringing it into simultaneous contact with a body of aluminium and a body of noble metal, preferably gold at a temperature of 30–55° C. Thus the egg may be caused to flow in contact with bodies of aluminium and noble metal such as gold at a raised temperature below 60° C. Preferably there is added to such egg a proportion of an innocuous electrolyte such as common salt to increase the conductivity.

The metals may suitably be independently heated preferably to different temperatures and egg to be treated is suitably allowed to flow therebetween. Thus one or both of the metals may be heated to a temperature not exceeding 60° C.

The sterilization may be assisted by electrically connecting the metals externally or by connecting them to a suitable external source of current so as to pass a gentle current of electricity through the egg between the electrodes. Chemical decomposition or excessive heating of egg undergoing treatment is of course to be avoided. In applying an external current the body of noble metal such as gold forms the cathode. The body of noble metal may be replaced by a body of commoner metal tipped with noble metal e. g. copper coated with or tipped with gold.

In a preferred form of the invention, the shells are broken and the whole egg (yolk and white) is mixed with from two to four per cent by weight of the purest grade of commercial common salt. Mixing may be effected on a calender or in a mill and is continued until the salt is fully dissolved. The solution is then evaporated in vacuo at a temperature low enough to prevent coagulation of the white and evaporation is continued until the consistency is fairly viscous, e. g. by evaporating from 30 to 45% of water; the salt content of the concentrate should not be above say 8%.

The accompanying drawings show an apparatus suitable for carrying out the present invention. In the drawings:—

Figure 1 is an elevation of a cylindrical apparatus with the wall removed showing the internal tubes in section.

Figure 2 is a sectional elevation of an apparatus of smaller capacity comprising a single tube.

Figures 3 and 4 are plan views of plates for securing the tubes in the apparatus shown in Figure 1.

Figure 5 is an elevation of the central tube upon which the rings shown in plan view in Figure 6 may be clipped.

The apparatus shown in Figure 1 comprises a casing 1. Pairs of plates 2, 2, and 3, 3 are secured in this casing by means not shown. The plates 2 have apertures 4 and upstanding portions 5 to secure copper tubes 6 in the vertical position. These copper tubes 6 have annular grooves 7 in which are clipped rings 8 of gold. The copper tubes 6 also pass through the plates 3 which are secured in the casing 1 and are provided with apertures 9. Secured in these apertures 9 are aluminium tubes 10.

The plates 2 and 3, which are preferably formed of insulating material, are further provided with apertures 11 and tubes 12 connecting these apertures.

Egg to be treated enters at 13, passes between the lower plates 2 and 3 and passes up the annulus between the tubes 6 and 10. It then passes into the space between the upper plates 2 and 3 and out at 14.

Hot water may be supplied at 15 flowing below the plates 2, up through the tubes 6 and also up through the lower tubes 12 and between the tubes 10. It then flows through the upper tubes 12 and into the space above the upper plate 2 and out at 16.

The rate of flow of egg to be treated may be varied as desired according to its nature and consistency i. e. whether yolk or white or whole egg is treated. The rate of the heating water may be varied according to the rate of flow of such egg to maintain the metal tubes 6 and 10 at the desired temperature.

The tubes 6 and 10 may if desired be placed in electrical connection and for this purpose may be connected together by a conductor of electricity or may be insulated from one another and supplied with external current at a potential difference of 4 to 8 volts, the tube 10 being the anode and the tube 6 the cathode.

In the modified apparatus shown in Figure 2 the tube 10 of aluminium is provided with an iron jacket 17 through which hot water may flow. The copper tube 6 provided with the gold rings 8 is mounted within the tube 10. Egg to be treated flows in at 18 and out at 19 under pressure if desired. Hot water flows through the outer jacket from 20 to 21 and through the inner copper tube from 22 to 23. The outlet 21 and inlet 22 may be connected by the tube 24.

The preferred temperature of operation is 58° C. The temperature should be as high as possible without coagulating the protein since it is desired to destroy the colon bacteria and this destruction is assisted by a moderate heat.

The sterilized product can be kept for a long time even at tropical temperatures.

On arrival at its destination after transport, the product can be either concentrated or diluted as desired and if the salt content is too high, this may be reduced by dialysis or osmosis.

When treating the yolks alone, they may be mixed with 2–8% common salt and treated as before after which the sterilized product is cooled to normal temperature and filled into sterile drums or containers for transport.

I declare that what I claim is:—

1. The process for sterilizing egg which process consists in subjecting egg simultaneously to heat at a temperature not in excess of 60° C. and to the action which occurs between two metallic surfaces arranged with a narrow space between them, one surface having a higher electro-potential than hydrogen, the other having a lower electro-potential than hydrogen, and both being chemically inert to the egg.

2. The process for sterilizing egg which process consists in subjecting egg simultaneously to heat at a temperature not in excess of 60° C. and to the action which occurs between two surfaces of aluminium and noble metal respectively arranged with a narrow space between them.

3. The process for sterilizing egg which process consists in subjecting egg simultaneously to heat at a temperature between 30° and 55° C. and to the action which occurs between two surfaces of aluminium and noble metal respectively arranged with a narrow space between them.

4. The process as claimed in claim 3 in which the noble metal is gold.

5. The process for sterilizing egg which process consists in adding salt to the egg and subjecting the mixture simultaneously to heat at a temperature between 30° and 55° C. and to the action which occurs between two metallic surfaces arranged with a narrow space between them, one surface having a higher electro-potential than hydrogen, the other having a lower electro-potential than hydrogen and both being chemically inert to the egg.

6. The process for sterilizing egg which process consists in adding salt to the egg and subjecting the mixture simultaneously to heat at a temperature between 30° and 55° C. and to the action which occurs between two surfaces of aluminium and noble metal respectively arranged with a narrow space between them.

7. The process as claimed in claim 6 in which the noble metal is gold.

In witness whereof, I have hereunto signed my name this 14 day of May 1927.

WINCENTY MATZKA.